United States Patent [19]
Andon et al.

[11] Patent Number: 5,117,106
[45] Date of Patent: May 26, 1992

[54] SCANNING PATTERN DRAWING APPARATUS

[75] Inventors: Hiroaki Andon; Michio Ohshima; Yuji Matsui; Takashi Okuyama; Toshitaka Yoshimura; Hidetaka Yamaguchi; Yasushi Ikeda; Jun Nonoka; Tamihiro Miyoshi; Mitsuo Kakimoto; Masatoshi Iwama; Hideyuki Morita; Satoru Tachihara; Akira Morimoto; Akira Ohwaki, all of Tokyo, Japan

[73] Assignee: Asahi Kogaku Kogyo K.K., Tokyo, Japan

[21] Appl. No.: 734,034

[22] Filed: Jun. 23, 1991

Related U.S. Application Data

[63] Continuation of Ser. No. 588,528, Sep. 26, 1990, abandoned, which is a continuation of Ser. No. 444,234, Dec. 1, 1989, abandoned.

[30] Foreign Application Priority Data

Dec. 5, 1988 [JP] Japan .................. 63-307452

[51] Int. Cl.[5] .............................. H01J 3/14
[52] U.S. Cl. ........................ 250/235; 358/494
[58] Field of Search .......... 250/234, 235, 236, 237 G; 346/108; 358/296, 302, 494

[56] References Cited

U.S. PATENT DOCUMENTS

| | | | |
|---|---|---|---|
| 4,285,012 | 8/1981 | Ohara et al. | 346/108 |
| 4,837,588 | 6/1989 | Imakawa et al. | 250/235 |
| 4,853,535 | 8/1989 | Suganuma | 250/235 |
| 4,855,761 | 8/1989 | Hiiro | 346/108 |
| 4,858,019 | 8/1989 | Ohara et al. | 358/296 |

FOREIGN PATENT DOCUMENTS 3236468 6/1983 Fed. Rep. of Germany.

Primary Examiner—David C. Nelms
Attorney, Agent, or Firm—Sughrue, Mion, Zinn Macpeak & Seas

[57] ABSTRACT

A scanning pattern drawing apparatus which scans the surface of a workpiece with a light beam so that a pattern is described on the workpiece with the issued light beam being controlled on the basis of pattern drawing data stored in a pattern memory, wherein the pattern drawing apparatus is able to read many pieces of data in a short period of time even if the frequency of the timing pulses is reduced and which therefore is capable of drawing a precise pattern on a workpiece. A scanning pulse generator produces as scanning pulse in response to a predetermined amount of scanning with the light beam. The scanning pulse is converted to a plurality of resulting timing pulses, and successive parallel outputs of the timing pulses are produced after delaying by a predetermined time. The pattern drawing data is read from the pattern memory in response to the delayed timing pulses.

15 Claims, 7 Drawing Sheets

SCANNING PATTERN DRAWING APPARATUS

This is a continuation of application Ser. No. 07/588,528 filed Sep. 26, 1990, abandoned, which is a continuation of application Ser. No. 07/444,234 filed Dec. 1, 1989, now abandoned.

BACKGROUND OF THE INVENTION

The present invention relates to a scanning pattern drawing apparatus. More particularly, the present invention relates to a scanning pattern drawing apparatus which scans the surface of a workpiece with a beam of light from a beam issuing device so that a pattern is described on the workpiece with the issued light beam being controlled on the basis of pattern drawing data stored in a pattern memory.

Scanning pattern drawing apparatuses are conventionally used to draw patterns on workpieces such as liquid-crystal electrodes and shadow masks. As shown schematically in FIG. 9, a conventional scanning pattern drawing apparatus is composed basically of a laser light beam generating unit 203 which issues laser light 201 toward a shutter unit 202, a scanning unit 205 which scans the surface of a substrate (workpiece) 204 such as a shadow mask with laser light 201 passing through the shutter unit 202, a memory 206 for storing pattern drawing data, and a controller 207 for reading data from the memory 206 and for controlling the scanning unit 205.

The controller 207 outputs timing pulses in response to scanning by the unit 205 with laser light 201 so that pattern drawing data is read from the memory 206. On the basis of the output data, the shutter unit 202 is turned on and off so that the substrate 204 is exposed to the laser light 201 in such a way that a predetermined pattern is described in accordance with the pattern drawing data.

Considering one period of scanning with laser light, the number of pieces of data read from the memory 206 is the same as the number of timing pulses produced by the controller 207.

With the recent demand for liquid-crystal panels capable of producing higher image quality or for integrated circuits having a higher packing density, it has been required that finer patterns be described on liquid-crystal electrodes or shadow masks. To meet this requirement and draw the finest possible patterns, manufacturers have generally taken two approaches. The first approach involves producing finer dots by minimizing the spot size of the laser beam, and the second is to increase the number of pixels in the pattern by maximizing the density of dots.

However, the number of pieces of data that are to be stored in memory increases with the number of pixels, so that the frequency of timing pulses for reading the data has to be increased as the number of pixels increases. At higher frequencies, it becomes difficult to control the timing pulses, and serious problems arise such as the generation of interfering electric waves.

SUMMARY OF THE INVENTION

An object, therefore, of the present invention is to provide a pattern drawing apparatus that is able to read many pieces of data in a short period of time even if the frequency of the timing pulses is reduced and which therefore is capable of drawing a precise pattern on a workpiece.

The above and other objects of the present invention are generally attained by a scanning pattern drawing apparatus which scans the surface of workpiece with a beam of light from beam issuing means so that a pattern is described on the workpiece with the issued light beam being controlled on the basis of pattern drawing data stored in a pattern memory. In accordance with the invention, the apparatus further includes scanning pulse generating means which generates a scanning pulse in response to a predetermined amount of scanning with the light beam, delay means that converts the scanning pulse to a plurality of timing pulses, produces successive parallel outputs of these timing pulses after being delayed by a predetermined time, and reads the pattern drawing data from the pattern memory in response to the delayed timing pulses, and scanning means for scanning the surface of the workpiece with the beam of light from the beam issuing means.

In accordance with the present invention, the scanning pulse generating means outputs a scanning pulse in response to a predetermined amount of scanning with the light beam, the delay means converts the output scanning pulse to a plurality of timing pulses and produces successive parallel outputs of these timing pulses after being delayed by a predetermined time, and the pattern drawing data is read from the pattern memory in response to the delayed timing pulses.

DESCRIPTION OF THE PREFERRED EMBODIMENTS

A preferred embodiment of the present invention as it relates to a scanning pattern drawing apparatus is described hereinafter with reference to the accompanying drawings.

Figure 2:
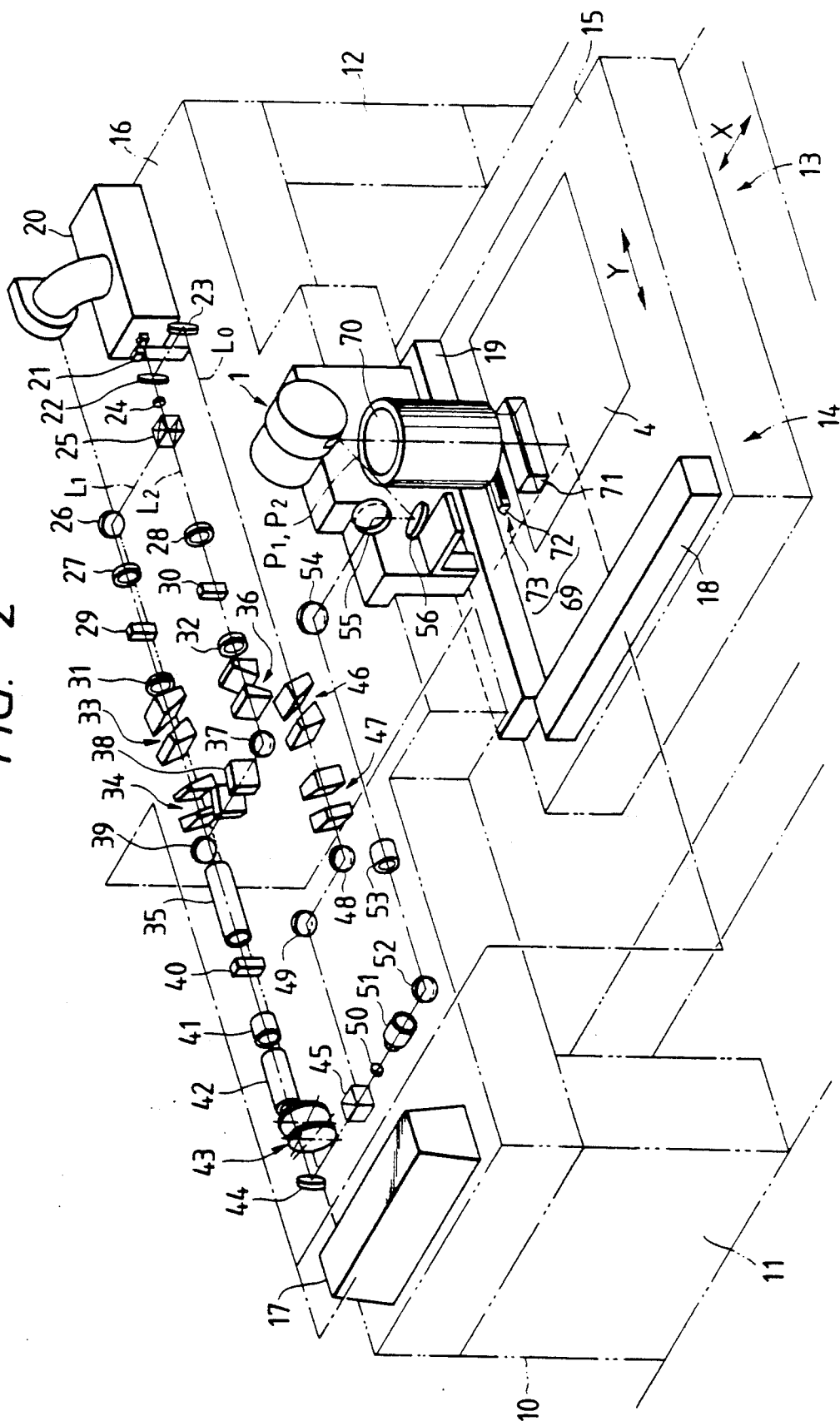
FIG. 2 is a perspective view showing schematically the construction of the scanning pattern drawing apparatus.

FIG. 2 is a diagram showing schematically the construction of the scanning pattern drawing apparatus. As shown therein, the apparatus includes a main body 10, legs 11 and 12 supporting the main body, an X table 13 which is slidable to reciprocate in the directions indicated by an arrow X, and a Y table 14 that is slidable to reciprocate in the directions indicated by arrow Y and which is equipped with a drawing board 15. The X table 13 and Y table 14 are positioned by means of a laser-operated measuring device which includes a laser light source 17 on the optical head unit 16 of the main body 10, an X-axis mirror 18 and a Y-axis mirror 19 mounted on the Y table 14. The beam issuing from the laser source 17 is split into two beamlets, which are directed to the respective mirrors 18 and 19 and reflected therefrom. Reception of the reflected beamlets enables positioning of the X and Y tables.

The optical head unit 16 has an additional laser light source 20. The laser beam issuing from this light source passes through a shutter 21 and is directed to a half-silvered mirror 22 which reflects about 5% of the incident light. The incident laser beam is split into two beamlets by means of the half-silvered mirror 22, and one of them is reflected toward a beam bender 23 to be used as monitor light $L_0$, whereas the predominant other beamlet passes through the half-silvered mirror 22 and is directed toward a half-wavelength plate 24 to be used as a scanning beam, which is described in detail below.

The half-wavelength plate 24 rotates the direction of polarization of the laser light through 90° in such a way that the light will be directed as an S-polarized component to an acousto-optical (AO) modulator (ultrasonic optical modulator using an acousto-optical device) to be described hereinafter, and directed to a polarizing synthesizer (to be described hereinafter) as a P-polarized component. The laser light passing through the half-wavelength plate 24 is directed to a beam splitter 25 which divides the light into two beamlets, one of which is reflected as a first pattern drawing beam $L_1$ and directed to a lens 27 through a beam bender 26. The other beamlet passes through the beam splitter 25 and is directed as a second pattern drawing beam $L_2$ to a lens 28. Two pattern drawing beams, rather than a single beam, are used in the present invention in order to increase the pattern drawing speed.

The first and second pattern drawing beams $L_1$ and $L_2$ are condensed by lenses 27 and 28, respectively, to converge at the positions where AO modulators 29 and 30 are located. The AO modulators 29 and 30 are controlled by an ultrasonic input from sweep oscillators 81 and 82 (see FIG. 1) so as to turn on and off the generation of a dot-forming beam spot on the surface of a workpiece 4.

The AO modulators 29 and 30 receive the first and second pattern drawing beams $L_1$ and $L_2$ and perform conversion from transmitted to diffracted light or vice versa in response to an ultrasonic input. The primary diffracted light emerging from the AO modulators 29 and 30 is used to draw patterns. Sweep oscillators 81 and 82 supply the AO modulators 29 and 30 with an ultrasonic input on the basis of information regarding dot exposure to be performed on the workpiece. Since the exposure information is stored in pattern memories (not shown) associated with respective individual scanning lines, each of the transducers is driven on the basis of successive pieces of exposure information delayed by one line.

The beams of diffracted light are collimated by lenses 31 and 32, respectively. The primary diffracted light colliminated by the lens 31 is deflected by a predetermined small angle as it passes through units 33 and 34 for fine tuning the optical axis, each of which units is composed of two prisms. The deflected light is directed to a lens unit 35. The primary diffracted light collimated by the lens 32 passes successively through a unit 32 for fine tuning the optical axis, a beam bender 37, a unit 38 for fine tuning the optical axis and a beam bender 39 to be directed to the lens unit 35. The axis tuning units 33, 34, 36 and 38 serve not only to separate a plurality of scanning beam spots on the surface of the workpiece by small amounts but also to insure high convergence of each spot.

The first and second pattern drawing beams $L_1$ and $L_2$ passing through the lens unit 35 are guided to an AO modulator 40 which compensates for the deviation of reflected light from the normal direction of reflection that occurs on account of the tilting of surface segments of a polygonal mirror 1.

The first and second pattern drawing beams $L_1$ and $L_2$ emerging from the compensating AO modulator 40 pass through a relay lens unit 41 and a lens unit 42 to be directed to a variable filter 43 for adjusting the quantity of light. The transmitted light has its optical path deflected by a beam bender 44 and directed to a polarizing synthesizer 45 which is capable of combining the optical path of monitor light $L_0$ and those of the first and second pattern drawing beams $L_1$ and $L_2$. The monitor light $L_0$ is launched into the synthesizer 45 after passing through optical axis tuning units 46 and 47 and beam benders 48 and 49. Since monitor light $L_0$ enters the synthesizer 45 as an S-polarized component, it is reflected by the synthesizer to be directed toward a half-wavelength plate 50. On the other hand, the first and second pattern drawing beams $L_1$ and $L_2$ which enter the synthesizer 45 as a P-polarized component pass through it to be directed toward the half-wavelength plate 50. The lens units 35 and 42 form a beam expander which enlarges the first and second incident pattern drawing beams $L_1$ and $L_2$ so that the diameter of the beams emerging from the lens unit 42 will be 1.67 times as large as the incident beams.

The direction of polarization of the pattern drawing beams $L_1$ and $L_2$ and the monitor light $L_0$ is rotated by the half-wavelength plate 50 through 90°. The first and second pattern drawing beams $L_1$ and $L_2$ and the monitor light $L_0$ that have passed through the lens unit 53 are deflected toward the polygonal mirror 1 by way of beam benders 54, 55 and 56, and reflected toward the surface of the workpiece 4 on the drawing board 15 by means of a surface segment 2 of the polygonal mirror 1. The lens units 51 and 53 function as a beam expander that enlarges the spots of the first and second pattern drawing beams $L_1$ and $L_2$ and the monitor light $L_0$ to have diameters about 21 times as large as the initial values. This is done in order to achieve maximum convergence of the beam spots by reducing their profiles on the surface of the workpiece 4. The relay lens unit 41 serves to render the compensating AO modulator 40 conjugative with each of the surface segments of the polygonal mirror 1. If the direction of emerging diffracted light were changed by the AO modulator 40 in order to compensate for the deviation of the direction of reflection due to the angle of tilting, $\theta$, of the individual surface segments 2 of the polygonal mirror 1, the area where light reflection occurs on a certain surface segment 2 of the polygonal mirror 1 would deviate from the area of reflection that occurred before the direction of the emerging diffracted light was changed. The relay lens unit 41 is used to avoid this problem.

The monitor light $L_0$, after being reflected by a certain surface segment 2 of the polygonal mirror 1, passes through an $f\theta$ lens 70 and is directed to a beam splitter 71, from which it is reflected and directed to a monitor unit 69. The monitor unit 69 is composed basically of an elongated scale 72 extending in the scanning direction and a light-receiving fiber unit 73. The scale 72 has a plurality of slits 72a (see FIG. 1) each having a width of 80 $\mu$m and which are spaced at a pitch of 160 $\mu$m in the scanning direction. The light-receiving fiber unit 73 is composed of an optical fiber assembly 73a and a light-receiving sensor 73b positioned at both ends of the fiber assembly 73a (see FIG. 2). The light-receiving sensors 73b detect the change in the quantity of transmitted monitor light $L_0$ and output pulses having a frequency proportional to the scanning speed. These pulses are used to generate position pulses which serve as scanning address information.

The scanning beam reflected from the polygonal mirror 1 is converged by the f$\theta$ lens 70 and passes through the polarizing beam splitter 71 to form a first and a second spot $R_1$ and $R_2$ having a diameter of 5 $\mu$m (see FIG. 7) on the surface of the workpiece 4. These two spots are spaced apart by a distance of 20 $\mu$m in the direction of main scanning and by 2.5 $\mu$m in the direction of sub-scanning, so that the surface of the workpiece 4 is subjected to simultaneous scanning with two scanning beams.

Figure 3:
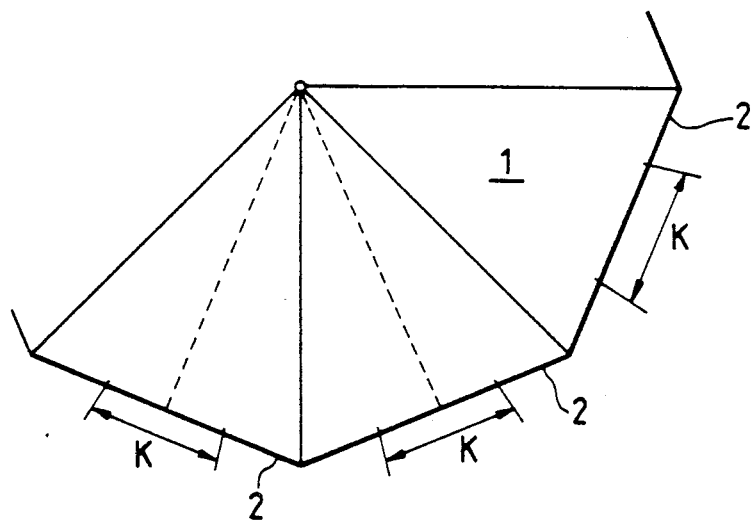
FIG. 3 is an illustration of a polygonal mirror.

As shown in FIG. 3, each of the first and second pattern drawing beams $L_1$ and $L_2$ strikes a predetermined area K of a surface segment 2 of the polygonal mirror 1. The predetermined area K corresponds to the area delineated by position 4a where exposure of the workpiece 4 starts and by position 4b where the exposure ends (see FIG. 8).

The laser light source 20, AO modulators 29 and 30 and associated devices combine together to form a light beam issuing unit.

Figure 1:
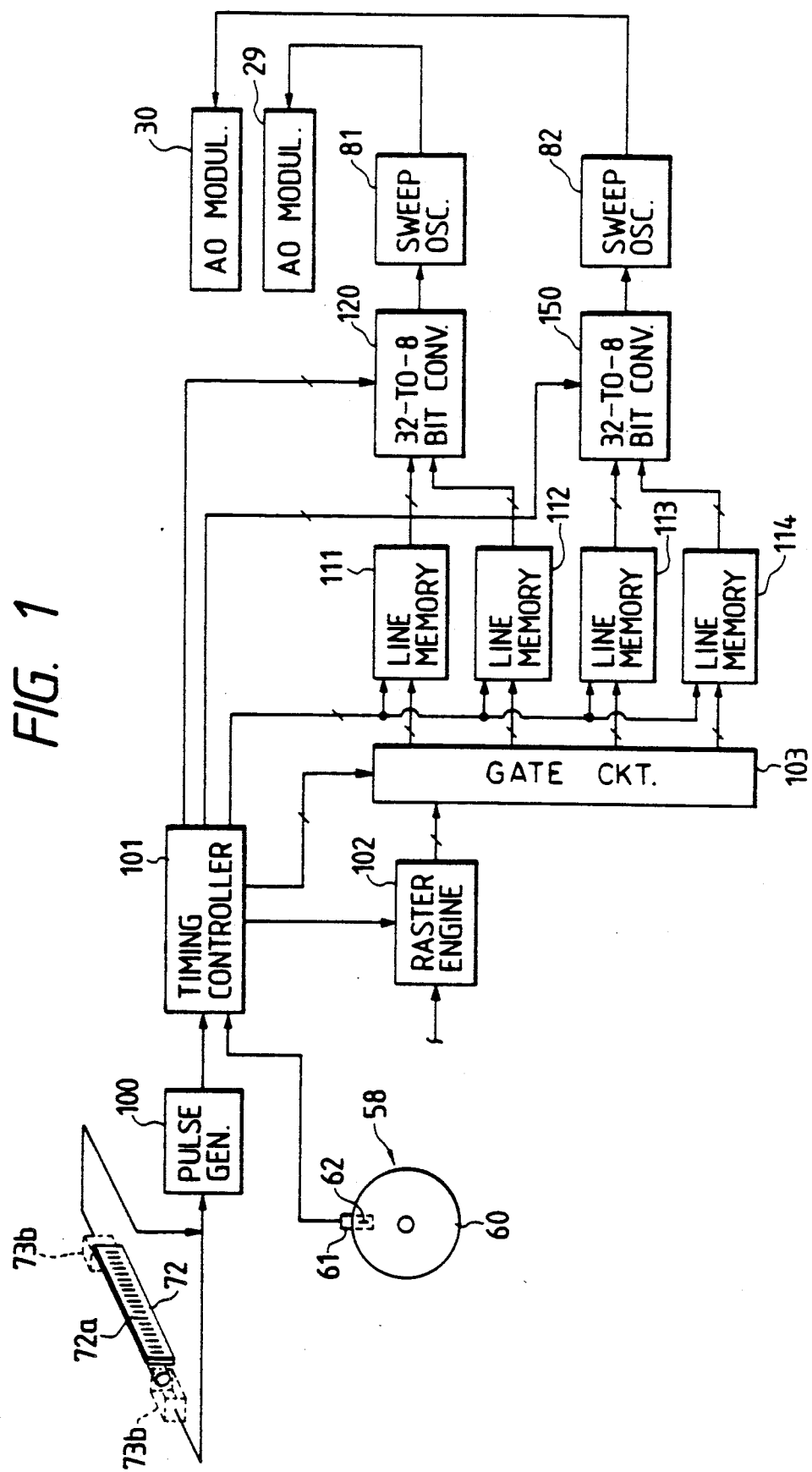
FIG. 1 is a block diagram showing the construction of a control system in a scanning pattern drawing apparatus of the present invention.

FIG. 1 is a block diagram showing the construction of a control system which reads pattern drawing data and controls the AO modulators and other devices in response to pulses produced from the light-receiving sensors 73b on the fiber assembly 73. Reference numeral 58 in FIG. 1 denotes a rotational position sensor for detecting one rotation of the polygonal mirror 1. This sensor is composed of a rotating slit plate 60 and a light emitting/receiving element 61. A single slit 62 is formed in the plate 60.

The slit plate 60 rotates in unison with the polygonal mirror 1 and the light emitting/receiving element 61 produces one pulse (rotation signal) per revolution of the polygonal mirror 1. The output pulse is fed to a timing controller 101 to be described hereinafter.

Figure 4:
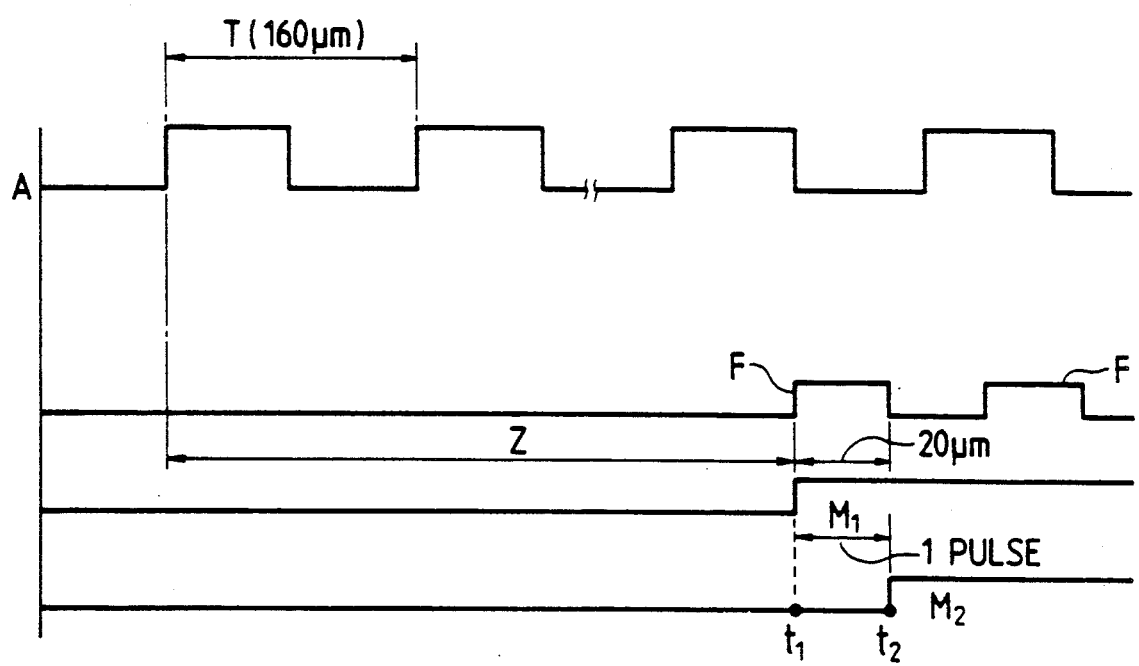
FIG. 4 is a diagram illustrating the relationship between position pulses and scanning pulses.

Indicated by reference numeral 100 is a pulse generator (scanning pulse generator) which shapes the waveform of the pulses from the light-receiving sensors 73b shown in FIG. 4 at A. The pulses produced by the light-receiving sensors 73b have a width T which is equal to the pitch (160 $\mu$m) by which the slits 72a in the scale 72 are spaced apart.

The timing controller 101 controls the timing of data writing and reading from line memories 111-114 (to be described below) and the operation of parallel-to-serial converters 120 and 150 on the basis of position pulses produced by the pulse generator 100 and rotation signals produced by the rotational position detecting sensor 58.

The timing controller 101 not only senses the rotation of the polygonal mirror 1 on the basis of the output of the sensor 58 but also divides the period of one rotation of the mirror electrically into eight equal portions so as to detect the transition from one reflecting surface segment of the mirror to another.

The timing controller 101 outputs a first READ timing signal for reading data from a raster engine 102 (to be described below), a designating signal for designating one of line memories 111-114, and a second READ timing signal for reading data from the line memories 111-114. As shown in FIG. 4, the timing controller 101 outputs successive scanning pulses F at time $t_1$ when data is to be read from the line memories 111-114 (i.e., when the number of pulses generated from the pulse generator 100 has reached a predetermined value Z). The width of each scanning pulse F is equal to 20 $\mu$m, which is one-eighth of the width of pulses generated from the pulse generator 100. The period of the pulses F is equal to 40 $\mu$m.

The pattern to be described on the surface of the workpiece 4 is keyed in by an input device (not shown). The raster engine 102 stores the data and successively outputs line data (i.e., corresponding to single individual lines of the pattern data) in response to the first READ timing signal produced by the timing controller 101. Reference numeral 103 indicates a gate circuit that designates one of the line memories 111-114 (which stores the line data produced by the raster engine 102) on the basis of the designation signal produced by the timing controller 101.

Line memories 111-114 store the line data from the raster engine 102 and output successively the stored line data in the form of 32-bit parallel signals in response to the second READ timing signal produced by the timing controller 101. The raster engine 102 and line memories 111-114 correspond to the pattern memory used in the apparatus of the present invention.

Line memories 111 and 112 store data for controlling the first pattern drawing beam $L_1$, whereas line memories 113 and 114 store data for controlling the second pattern drawing beam $L_2$.

Line memories 111 and 112 first store line data $M_1$ and $M_3$, respectively, that correspond to the first and third scanning lines, and line memories 113 and 114 store line data $M_2$ and $M_4$, respectively, that correspond to the second and fourth scanning lines.

To control the first and second pattern drawing beams $L_1$ and $L_2$, line memories 111 and 113 read line data $M_1$ and $M_2$ which correspond to the first and second scanning lines. When the first and second pattern drawing beams $L_1$ and $L_2$ complete a first scanning cycle, line memories 112 and 114 read line data $M_3$ and $M_4$ which correspond to the third and fourth scanning lines, and scanning is performed for the second cycle.

During the second scanning cycle, or when line data $M_3$ and $M_4$ which correspond to the third and fourth scanning lines are being read from the line memories 112 and 114, line data corresponding to the fifth and sixth scanning lines is written into the line memories 111 and 113. Similarly, when line data corresponding to the fifth and sixth scanning lines are being read from the line memories 111 and 113, line data for the seventh and eighth scanning lines are written into the line memories 112 and 114.

Thus, scanning with the first and second pattern drawing beams $L_1$ and $L_2$ is performed continuously as accompanied by alternate writing and reading of line data.

Figure 5:
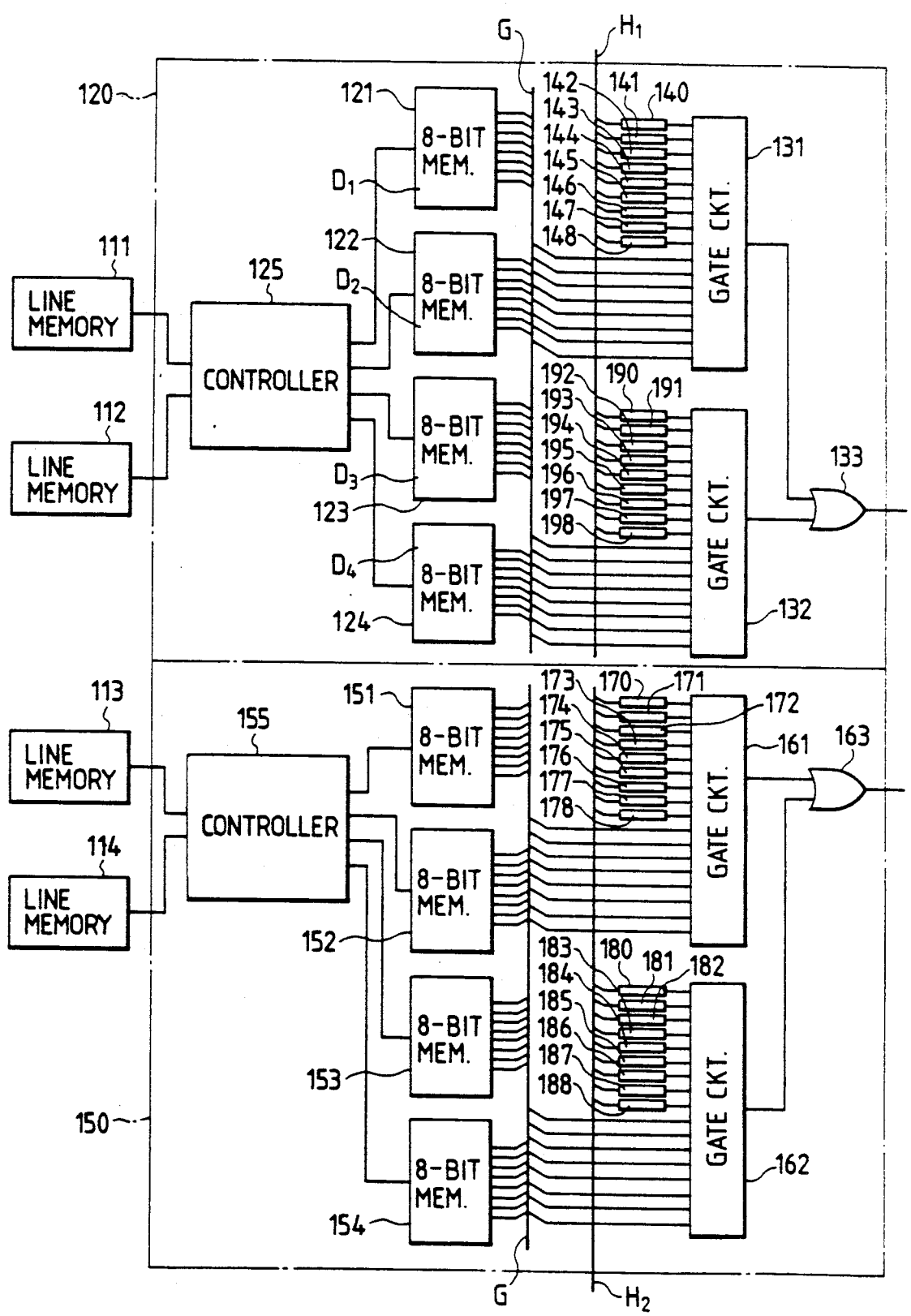
FIG. 5 is a circuit diagram of a parallel-to-serial converter.

Serial converters 120 and 150 perform parallel-to-serial conversion on 32-bit line data produced from the line memories 111-114. As shown in FIG. 5, serial converter 120 (or 150) is composed basically of a controller 125 (155) which divides the 32-bit parallel line data from the line memories 111 and 112 (or 113 and 114) into four eight-bit blocks, eight-bit memories 121-124 (or 151-154) which store the four eight-bit blocks of parallel data and transfer the stored data as parallel signals in response to a transfer signal from the timing controller 101. an eight-bit gate circuit 131 (161) which successively outputs the transferred eight-bit parallel data after it is converted to serial data in response to the rise of a timing pulse (to be described hereinafter), an eight-bit gate circuit 132 (162) which successively outputs the transferred eight-bit parallel data after it is converted to serial data in response to the fall of the timing pulse, an OR gate 133 (163), and delay lines (delay means) 140-148 and 190-198 (or 170-178 and 180-188) which are parallel-connected to the line $H_1$ (or $H_2$) that is supplied with scanning pulses F. Reference character G represents a bus.

Operations such as data division by controllers 125 and 155, writing of data into the eight-bit memories 121-124 and 151-154 and the transfer of such data are performed with the timing controller 101.

The delay lines 140-148, 190-198, 170-178 and 180-188 convert scanning pulses F from the timing controller 101 into nine timing pulses P. The delay lines feed the timing pulses P to gate circuits 131, 132, 161 and 162 after being delayed by a predetermined time. The delay time is equal to 2.5 $\mu$m. The delay time of delay line 141 is longer than that of delay line 140 by 2.5 $\mu$m. Similarly, the delay time of the delay lines 142-148 is longer than that of the delay lines 141-147, respectively, by 2.5 $\mu$m. The delay lines 140-148 have the same delay time as the delay lines 190-198, 170-178 and 180-188.

It is assumed that the line memory 111 outputs 32-bit parallel data, which is divided using controller 125 into four eight-bit parallel data $D_1$, $D_2$, $D_3$ and $D_4$ which are stored in four eight-bit memories 121-124, respectively (from top to bottom in FIG. 5). In this case, the eight-bit memory 121 transfers eight-bit parallel data $D_1$ to the gate circuit 131, and the eight-bit memory 122 transfers the eight-bit parallel data $D_2$ into the gate circuit 132.

Figure 6:
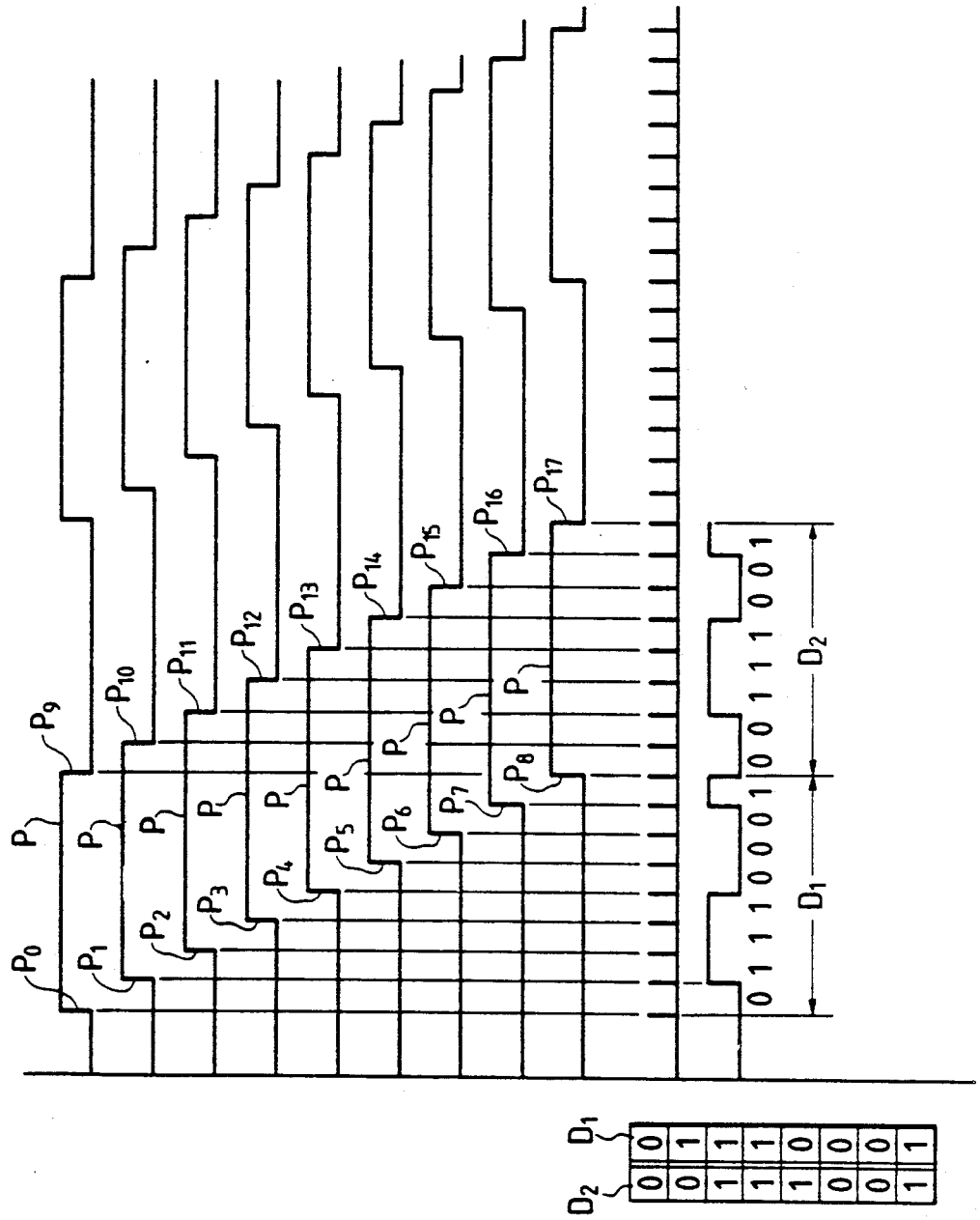
FIG. 6 is an illustration of timing pulses.

The timing controller 101 outputs scanning pulses F having the waveform shown in FIG. 4. As shown in FIG. 6, these scanning pulses are converted to nine timing pulses 9 by means of the delay lines 140-148 and the rising edge $P_0$ of the timing pulse P is supplied to the gate circuit 131 via the delay line 140. If the parallel data transferred to the gate circuit 131 is "01110001" as indicated by $D_1$ in FIG. 6, output data "0" is produced from the gate circuit 131. In the next place, the rising edge $P_1$ of the timing pulse P, which has been delayed by predetermined time by the delay line 142, is fed to the gate circuit 131, and hence output data "1" is produced from the gate circuit 131. Similarly, the rising edges $P_2$–$P_7$ of the timing pulses P which have been delayed by a predetermined time by the delay lines 143-148 are successively fed to the gate circuit 131, which then outputs successive data "1", "1", "0", "0", "0" and "1" in series.

Subsequently, the rising edge $P_8$ of the timing pulse P is fed to the gate circuit 131 from the delay line 149, whereupon the outputting of data "1" from the gate circuit 131 which has been triggered by the rising edge $P_7$ ceases.

The gate circuit 132 is also supplied with the rising edges $P_0$–$P_8$ of the timing pulses P, but since the gate circuit 132 produces no data in response to the rise of these pulses, the gate circuit 132 will not output data $D_2$ as long as the output data $D_1$ is being produced from the gate circuit 131.

Simultaneously with the supply of the rising edge $P_8$ to the gate circuit 131, the falling edge $P_9$ of the timing pulse P is supplied to the gate circuit 132 from the delay line 190, whereupon "0" in parallel data $D_2$ (see FIG. 6) is produced by the gate circuit 132. Similarly, when the falling edges $P_{10}$–$P_{16}$ of the timing pulses P, which have been delayed by a predetermined time by the delay lines 191-198, are successively fed into gate circuit 132, the latter output successive data "0", "1", "1", "1", "0", "0" and "1" in series.

Subsequently, the falling edge $P_{17}$ of the timing pulse P is fed to the gate circuit 132, whereupon the outputting of data "1" from the gate circuit 132 ceases.

When data $D_2$ is being produced from the gate circuit 132, the falling edges $P_9$–$P_{17}$ of the timing pulses P are supplied to the gate circuit 131. However, the outputting of data from the gate circuit 131 is not triggered by the falling edge of a pulse, and hence no data is produced thereby as long as data $D_2$ is being produced.

Thus, according to the present invention, a plurality of timing pulses having a low frequency are fed into the gate circuits 131 and 132 after they have been delayed by a predetermined time. This enables a high volume of pattern drawing data to be read within a short period of time. Further, the low frequency of the timing pulses contributes to limiting the occurrence of interfering electric waves.

When serial data $D_2$ is being read from the gate circuit 132, parallel data $D_3$ stored in the eight-bit memory 123 is transferred to the gate circuit 131. Similarly, when serial data $D_3$ is being read from the gate circuit 131, parallel data $D_4$ stored in the eight-bit memory 124 is transferred into gate circuit 132. In this way, 32-bit parallel data are successively produced from the gate circuits 131 and 132 after being converted to serial data.

When parallel data $D_1$–$D_4$ stored in the eight-bit memories 121-124 are transferred successively into the gate circuits 131 and 132, the eight-bit memories 121-124 will successively become empty, but then they are successively loaded with new 32-bit parallel data $D_1'$–$D_4'$, which are successively transferred to the gate circuits 131 and 132 in the same manner as described above.

The above-described operations are repeated for all line data for each individual scanning line produced in series from the line memory 111.

Serial data produced from gate circuits 131 and 132 are supplied to a sweep oscillator 81 via an OR gate 133. When the input data to the sweep oscillator 81 is "1", the latter supplies an ultrasonic input to the AO modulator 29 so that the first pattern drawing beam $L_1$ is changed to diffracted light for exposing a predetermined area of the workpiece 4. If the input data is "0", the sweep oscillator 81 turns off the supply of an ultrasonic input to the AO modulator 29, which then changes the first pattern drawing beam $L_1$ to transmitted light so that a predetermined area of the workpiece 4 will be in an unexposed state. In this way, a precise pattern can be described on the surface of the workpiece 4.

The serial converter 150 operates in entirely the same manner as the serial converter 120 and hence it will not be described in further detail.

Figure 7:
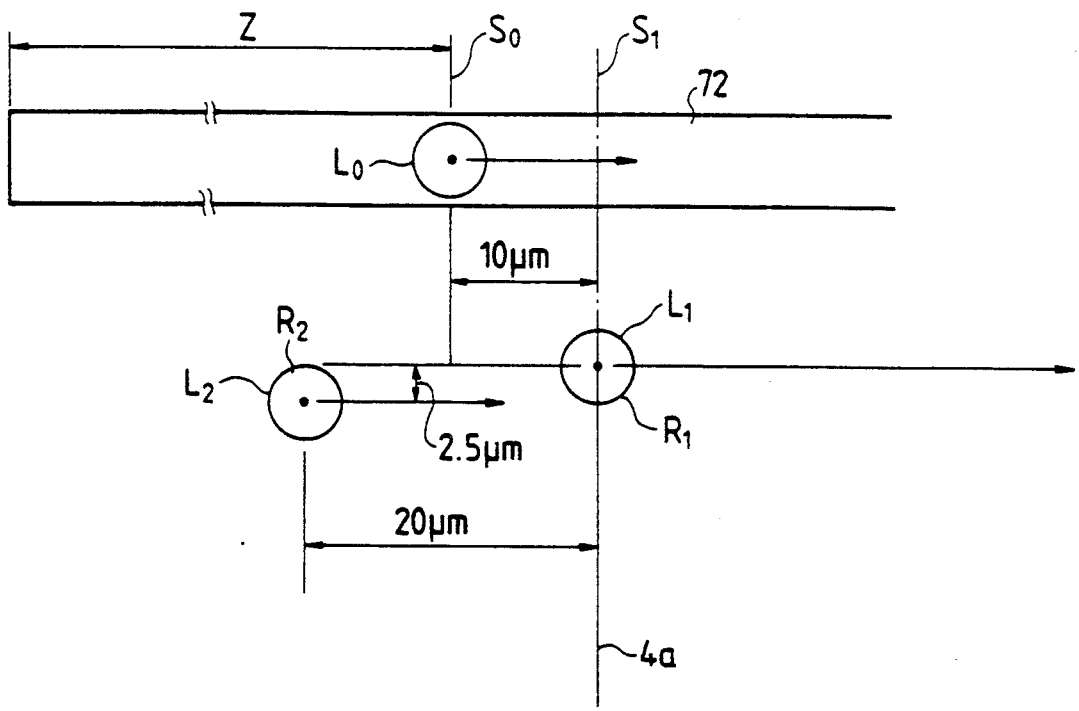
FIG. 7 shows the position of monitor light relative to first and second pattern drawing beams.
Figure 8:
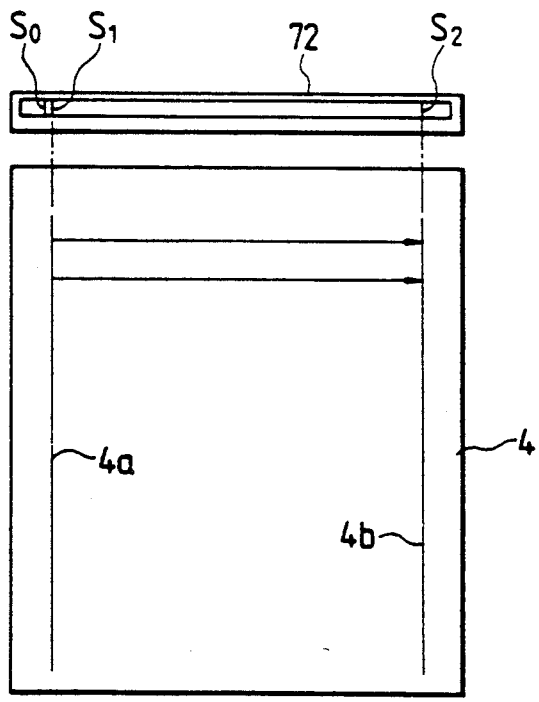
FIG. 8 is shows how a slit scale corresponds to the range of scanning of a workpiece with pattern drawing light.
Figure 9:
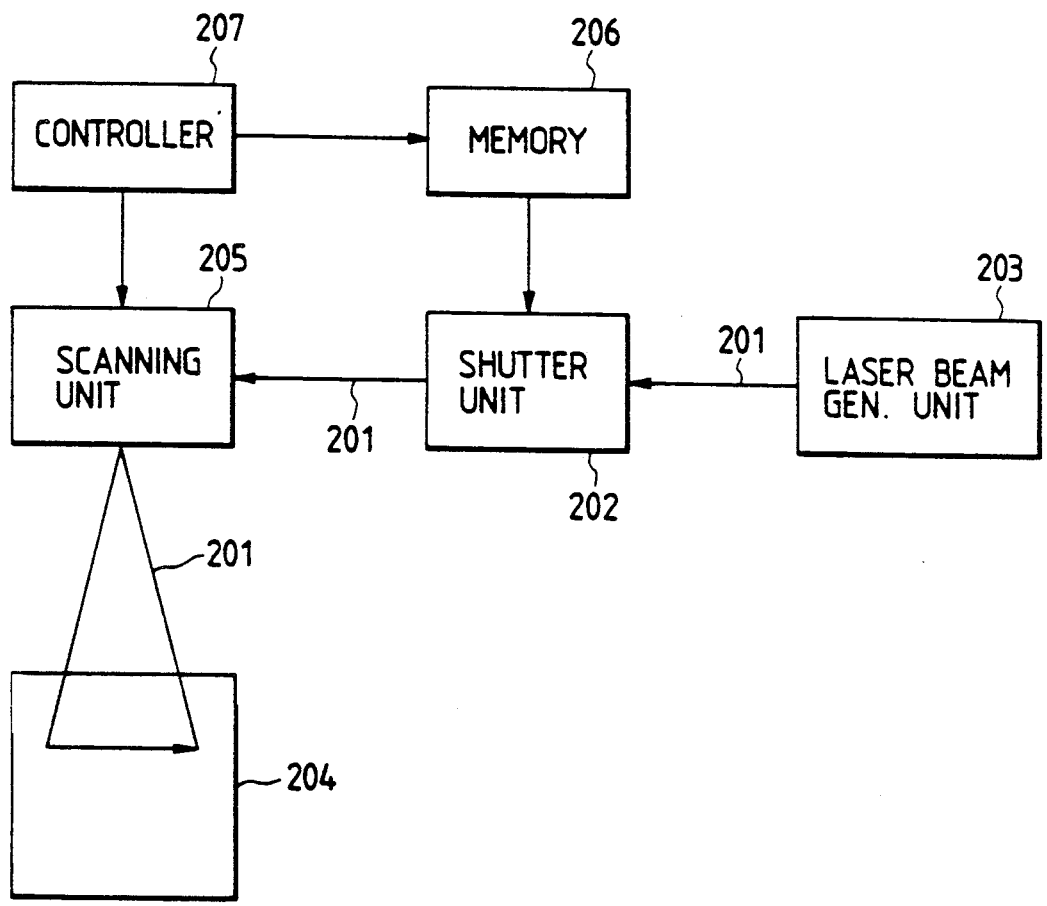
FIG. 9 is a diagram showing schematically the construction of a prior art scanning pattern drawing apparatus.

The point 4a of the workpiece 4 where exposure is started and the end point 4b correspond to positions $S_1$ and $S_2$, respectively, on the scale 72, as shown in FIG. 8. The position of the monitor light $L_0$ relative to the first and second pattern drawing beams $L_1$ and $L_2$ is shown in FIG. 7. The first pattern drawing beam $L_1$ is positioned 10 $\mu$m ahead of the monitor light $L_0$, whereas the second pattern drawing beam $L_2$ is positioned 10 μm behind the monitor light $L_0$. Hence, line data must be read from the serial converter 120 when the monitor light $L_0$ is at the position indicated by $S_0$ in FIG. 7. This is accomplished by the following procedure. First, the number of pulses that will have been produced from pulse generator 100 when the monitor light $L_0$ scans the surface of the workpiece 4 from position 72c (where a selected slit 72 is formed on the scale 72) to the position $S_0$ are preliminarily counted. Then, the number of pulses from the pulse generator 100 is counted with the timing controller 101. Finally, a scanning pulse F is outputted when the count becomes equal to the predetermined value Z.

As already discussed, the first and second pattern drawing beams $L_1$ and $L_2$ are spaced apart by a distance of 20 μm in the direction of main scanning. Thus, after generation of a single position pulse at the time $t_1$ when a scanning pulse F is fed to line $H_1$ in serial converter 120, another scanning pulse F is fed to line $H_2$ in serial converter 150, thereby delaying the reading of data for the second pattern drawing beam $L_2$. In other words, line data $M_2$ is read at time $t_2$ which is delayed by the width of one position pulse from the reading of line data $M_1$ at time $t_1$ (see FIG. 4).

As described above, the scanning pattern drawing apparatus of the present invention includes scanning pulse generating means which generates a scanning pulse in response to a predetermined amount of scanning with a beam of light, and delay means that converts the scanning pulse to a plurality of timing pulses, produces successive parallel outputs of these timing pulses after being delayed by a predetermined time, and reads the pattern drawing data from a pattern memory in response to the delayed timing pulses. With this arrangement, the apparatus of the present invention offers the following two major advantages. First, a high volume of pattern drawing data can be read within a short period of time even if the frequency of the timing pulses is lowered. Second, precise patterns can be described without producing any interfering electric waves.

What is claimed is:

1. In a scanning pattern drawing apparatus which scans the surface Of a workpiece with a light beam from beam issuing means so that a pattern is described on the workpiece with the issued light beam being controlled on the basis of pattern drawing data stored in a pattern memory, the improvement wherein said apparatus further comprises: scanning pulse generating means for generating a scanning pulse in response to a predetermined amount of scanning with said light beam; delaying means for converting said scanning pulse to a plurality of timing pulses, producing successive parallel outputs of said timing pulses after being delayed by a predetermined time, and reading said pattern drawing data from said pattern memory in response to said delayed timing pulses; and means for scanning a surface of said workpiece with said light beam modulated in accordance with said pattern drawing data read from said pattern memory.

2. The scanning pattern drawing apparatus of claim 1, wherein said delaying means comprises: an m-bit memory receiving m bits of data from said pattern memory; m+1 delay elements, each receiving as an input said scanning pulse, said delay elements having delay times which differ in succession from one another by a predetermined amount; and a gate circuit receiving m bits of data from said m-bit memory as a first set of inputs and outputs of said delay elements as a second set of inputs.

3. The scanning pattern drawing apparatus of claim 1, wherein said pattern memory comprises a plurality of line memories, and wherein said delaying means comprises: four eight-bit memories each receiving eight bits of data from a respective one of said line memories; first and second sets of nine delay elements, each of said delay elements receiving as an input said scanning pulse, said delay elements within each of said first and second sets having delay times which differ in succession from one another by a predetermined amount; first and second gate circuits each receiving eight bits of data from two of said eight-bit memories as a first set of inputs and outputs of a respective one of said sets of said delay elements as a second set of inputs; and an OR gate receiving as inputs outputs of said first and second gate circuits.

4. The scanning pattern drawing apparatus of claim 3, further comprising controller means for alternatingly transferring data from said line memories to pairs of said eight-bit memories.

5. In a scanning pattern drawing apparatus which scans the surface of a workpiece with a light beam controlled on the basis of pattern drawing data stored in a pattern memory so that a pattern is described on the workpiece with the light beam, the improvement wherein said apparatus further comprises:
scanning pulse generating means for generating a scanning pulse for each predetermined amount of scanning with said light beam;
timing pulse means for converting each scanning pulse to a plurality of timing pulses;
a plurality of memories each storing at least a portion of said pattern drawing data from said pattern memory; and
reading means for reading data out of each of said memories in response to respective ones of said timing pulses.

6. The scanning pattern drawing apparatus of claim 5, wherein the timing pulses corresponding to each scanning pulse are staggered in time with respect to one another.

7. The scanning pattern drawing apparatus of claim 6, wherein a total delay time between a first of said timing pulses and a last of said timing pulses corresponding to a given scanning pulse is not greater than the duration of each of said plurality of timing pulses.

8. The scanning pattern drawing apparatus of claim 6, wherein said plurality of memories includes at least first and second memories, and said reading means reads data out of said first memory in response to leading edges of said timing pulses and reads data out of said second memory in response to trailing edges of said timing pulses.

9. The scanning pattern drawing apparatus of claim 5, wherein said plurality of memories comprises first, second, third and fourth memories and said reading means provides as an output data from said memories during respective first through fourth periods of time.

10. The scanning pattern drawing apparatus of claim 9, wherein said the timing pulses used to read data out of said memories during said first through fourth periods of time are derived from two of said scanning pulses.

11. In a scanning pattern drawing apparatus which scans the surface of a workpiece with a light beam controlled on the basis of pattern drawing data stored in a pattern memory so that a pattern is described on the workpiece with the light beam, the improvement wherein said apparatus further comprises:
- a scanning pulse generator which generates a scanning pulse for each time that the light beam scans a predetermined amount of said workpiece;
- a timing pulse generator which is responsive to each said scanning pulse to generate a plurality of timing pulses delayed with respect to one another;
- a plurality of memories each storing in parallel form at least a portion of said pattern drawing data from said pattern memory; and
- a parallel-to-serial converter which converts parallel data from said plurality of memories into serial data with a data rate corresponding to the relative delays between said timing pulses.

12. The scanning pattern drawing apparatus of claim 11, wherein a total delay time between a first of said timing pulses and a last of said timing pulses corresponding to a given scanning pulse is not greater than the duration of each of said plurality of timing pulses.

13. The scanning pattern drawing apparatus of claim 12, wherein the plurality of memories includes at least first and second memories, and said parallel-to-serial converter converts data from said first memory into serial form in response to leading edges of said timing pulses and converts data from said second memory into serial form in response to trailing edges of said timing pulses.

14. The scanning pattern drawing apparatus of claim 11, wherein said plurality of memories comprises first, second third and fourth memories and said parallel-to-serial converter provides as an output data from said memories during respective first through fourth periods of time.

15. The scanning pattern drawing apparatus of claim 14, wherein said the timing pulses used to convert data from said memories during said first through fourth periods of time are derived from two of said scanning pulses.

* * * * *